US011250617B1

(12) United States Patent
Sempe et al.

(10) Patent No.: US 11,250,617 B1
(45) Date of Patent: Feb. 15, 2022

(54) VIRTUAL CAMERA CONTROLLED BY A CAMERA CONTROL DEVICE

(71) Applicant: Amazon Technologies, Inc., Seattle, WA (US)

(72) Inventors: Luis Sempe, Corona, CA (US); Christopher Scot Roby, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 16/583,146

(22) Filed: Sep. 25, 2019

(51) Int. Cl.
  *G06T 15/20* (2011.01)
  *G06F 3/01* (2006.01)
  *G06T 19/00* (2011.01)
  *H04L 29/06* (2006.01)

(52) U.S. Cl.
  CPC ............ *G06T 15/20* (2013.01); *G06F 3/012* (2013.01); *G06T 19/003* (2013.01); *H04L 65/4076* (2013.01); *G06T 2219/024* (2013.01)

(58) Field of Classification Search
  CPC . G06T 15/20; G06T 19/003; G06T 2219/024; G06T 19/006; G06T 19/20; G06T 19/00; G06T 11/60; G06T 15/005; G06T 2200/04; G06T 2200/24; G06T 3/20; G06F 3/012; G06F 3/011; G06F 3/04815; G06F 3/013; G06F 17/18; G06F 3/00; G06F 3/01; G06F 3/017; G06F 3/0346; H04L 65/4076; G02B 2027/014
  See application file for complete search history.

(56) References Cited

U.S. PATENT DOCUMENTS

| | | | | |
|---|---|---|---|---|
| 10,359,863 B2* | 7/2019 | Seegmiller | .......... | G06F 3/04815 |
| 10,650,591 B1* | 5/2020 | Muskin | ................ | G06T 19/003 |
| 10,671,258 B2* | 6/2020 | Lee | ..................... | G06F 3/04842 |
| 2011/0042459 A1* | 2/2011 | Sullivan | .................... | F41G 5/06 |
| | | | | 235/407 |
| 2012/0236158 A1* | 9/2012 | Oleksy | ................. | H04N 5/2251 |
| | | | | 348/207.1 |
| 2015/0106442 A1* | 4/2015 | Baldachin | ........... | H04L 67/2823 |
| | | | | 709/203 |
| 2015/0258431 A1* | 9/2015 | Stafford | ............. | A63F 13/5255 |
| | | | | 463/31 |
| 2016/0299563 A1* | 10/2016 | Stafford | ............... | G02B 27/017 |
| 2018/0165881 A1* | 6/2018 | Pohl | ....................... | G06T 19/20 |

(Continued)

*Primary Examiner* — Abderrahim Merouan
(74) *Attorney, Agent, or Firm* — BakerHostetler

(57) ABSTRACT

A technology is described for capturing electronic images of a three-dimensional environment using a virtual camera. In one example of the technology, positioning data may be obtained for a camera control device in a physical environment. The positioning data may define a physical position and physical orientation of the camera control device in the physical environment. A virtual camera may be placed and controlled in a virtual three-dimensional (3D) environment using in part the positioning data for the camera control device to determine a virtual position and virtual orientation of the virtual camera in the virtual 3D environment. A view of the virtual 3D environment, from a viewpoint of the virtual camera, may be determined using the virtual position and virtual orientation of the virtual camera in the virtual 3D environment, and electronic images of the virtual 3D environment may be rendered as defined by the view.

19 Claims, 10 Drawing Sheets

(56) References Cited

U.S. PATENT DOCUMENTS

| | | | |
|---|---|---|---|
| 2018/0197324 A1* | 7/2018 | Hanamoto | G06T 15/205 |
| 2018/0270412 A1* | 9/2018 | Kanda | H04N 5/232933 |
| 2019/0012824 A1* | 1/2019 | Sun | G06F 3/013 |
| 2019/0182424 A1* | 6/2019 | Omari | H04N 5/23287 |
| 2019/0289193 A1* | 9/2019 | Bevirt | H04N 5/2257 |
| 2019/0295324 A1* | 9/2019 | Servant | A63F 13/5258 |
| 2019/0384420 A1* | 12/2019 | Cho | G06F 3/014 |
| 2020/0041996 A1* | 2/2020 | Bachrach | G06F 3/00 |
| 2020/0234496 A1* | 7/2020 | de Belle | A63B 71/0622 |

* cited by examiner

VIRTUAL CAMERA CONTROLLED BY A CAMERA CONTROL DEVICE

BACKGROUND

The evolution of the Internet, including the increasingly widespread availability of broadband connections, and support for high-resolution video and graphics has enabled increased amounts of graphical data and video to be sent to client devices. In addition, the availability and capabilities of consumer computing devices including, but not limited to, mobile computing devices and powerful gaming consoles has led to continuing evolution and growth of online, virtual 3D (three dimensional) environments and 3D virtual worlds.

Some examples of virtual 3D worlds may include virtual meeting places, virtual market places, and other virtual spaces. Another example of virtual 3D worlds is the generation of computer games using 3D virtual worlds. Online games may include everything from relatively simple, two-dimensional (2D) casual games to more complex 2D or three-dimensional (3D) action, sports, or strategy games. Online games may involve one or more players in a game session, multiplayer online battle arena games, world-building multiplayer games, and complex 3D massively multiplayer online games, such as massively multiplayer online role-playing games that may support hundreds or thousands of active players in a persistent online "world".

DETAILED DESCRIPTION

Figure 1:
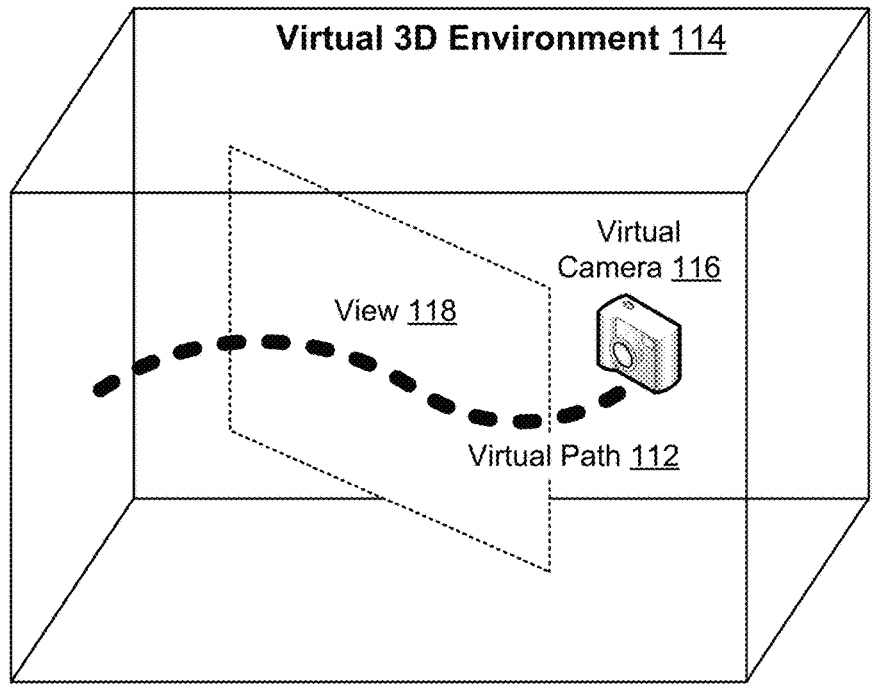
FIG. 1 is a diagram used to illustrate a camera control device used to control a virtual camera in a virtual 3D environment and capture electronic images of the virtual 3D environment.
Figure 1:
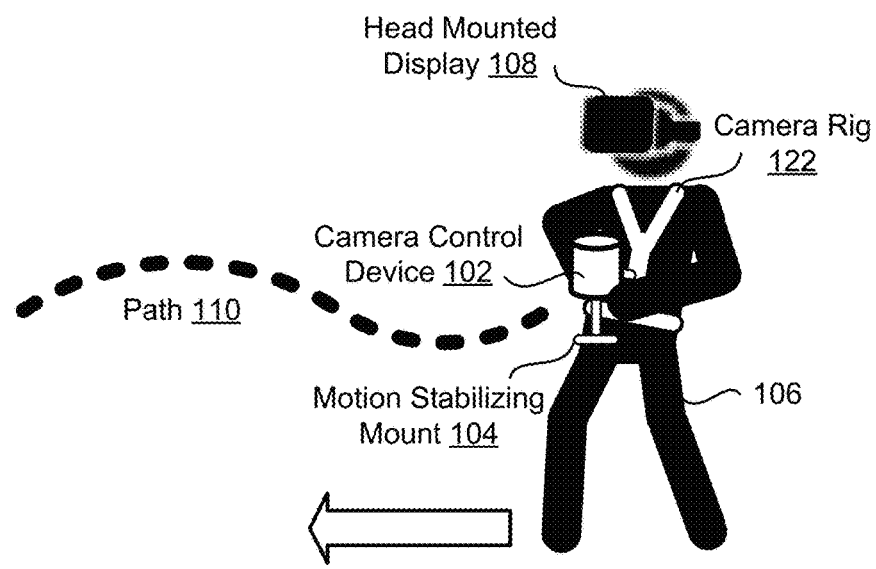

Technologies are described for capturing electronic images of a virtual 3D environment using a virtual camera which may be controlled using a camera control device that physically represents the virtual camera in the virtual 3D environment. Illustratively, a user may be provided with a camera control device that represents a virtual camera and a display device, such as a head mounted display, to view a virtual three-dimensional (3D) environment, and the user may navigate through the virtual 3D environment and use the camera control device to control a virtual camera and capture video or images of the virtual 3D environment, including events and actions (e.g., renderings of virtual objects and movement of virtual objects) that may be occurring in the virtual 3D environment. The electronic images captured by the virtual camera may be saved to a storage device, and/or streamed to a plurality of clients to allow spectators to view the stream of electronic images. Alternatively, position data that includes position, orientation, and path information for a camera control device may be captured and stored, and the position data may be altered and used to re-render electronic images or videos of a virtual 3D environment. A virtual 3D environment may be a generated computer graphics environment where the environment, or a portion of the environment, is rendered using computer graphics. Examples of a virtual 3D environment may include virtual reality (VR) environments, augmented reality (AR) environments, mixed reality (MR) environments, graphical simulation environments, gaming environments, as well as other computer-generated environments.

In one example, a camera control device may be a hardware device configured with sensors that provide positioning data for the camera control device to a system that hosts a virtual 3D environment. Examples of the sensors may be orientation sensors, acceleration sensors, gyroscopes, proximity sensors, magnetometers, global positioning systems (GPS) or other similar types of positioning sensors. For example, a dummy block, weight, rectangular block or other object may be used as a proxy for the camera and the sensors may measure the position and orientation of the object used to simulate the camera. The positioning data may specify a physical position, physical orientation and/or physical path of the camera control device in a physical space. In another example, a camera control device may be hardware device that is capable of being tracked by an external tracking system with a reference point (e.g., an origin or another reference grid) which provides positioning data for the camera control device to a system that hosts a virtual 3D environment. The system hosting the virtual 3D environment may use the positioning data for the camera control device to determine a virtual position, virtual orientation, and virtual path of a virtual camera in a virtual 3D environment. In one example, the camera control device may be attached to a camera rig that includes a motion stabilizing mount configured to stabilize the camera control device against disruptive motion that may occur while capturing electronic images of a virtual 3D environment.

The camera control device may include camera hardware simulation controls that correspond to virtual camera controls that allow a user to control functions of the virtual camera, such as start/stop capture, zooming, panning, filter selection, virtual lens selection, and other camera functions. The camera control device may have knobs, levers, button, voice controls, or other controls that simulate control of an actual camera. When a user of the camera control device activates these controls, then the changes to the controls may affect the virtual camera. For example, twisting a zoom knob on the camera control device will result in an increase or decrease in zoom that may be applied to the virtual camera.

As described above, positioning data for a camera control device may be used to determine a virtual position, virtual orientation and/or virtual path of the virtual camera in a virtual 3D environment. For example, the system hosting the virtual 3D environment may correlate the positioning data to a virtual position, virtual orientation and/or virtual path of the virtual camera in the virtual 3D environment and generate the virtual camera at a specific location in the virtual 3D environment. The system may determine a view of the virtual 3D environment from a perspective of the virtual camera using the virtual position, orientation and/or path of the virtual camera, as well as parameters for virtual camera controls (e.g., zoom, pan, lens selection), and the system may render the virtual 3D environment as defined by the view. For example, the system may obtain data associated with the view, which may include 3D models, geometry and event data for the virtual 3D environment, and the system may render the view of the virtual 3D environment to provide data which may be output to a display device, such as a head mounted display, to allow a user to view the virtual 3D environment from the perspective the virtual camera. Accordingly, a user may be provided with a simulated camera view finder to view the virtual 3D environment and capture electronic images of the virtual 3D environment.

A user may navigate a virtual camera through a virtual 3D environment by physically moving around a physical space with a camera control device to direct a virtual lens of the virtual camera at subjects in the virtual 3D environment. The user may manipulate a view of the virtual 3D environment, as viewed through a simulated camera view finder, using virtual camera controls which may be mapped to the camera control device, or alternatively to another controller device, such as a game controller. The virtual camera controls may allow the user to capture electronic images of the virtual 3D environment and control other camera functions. Electronic images (e.g., video and/or images) of the virtual 3D environment captured using a virtual camera may include events and actions that may be occurring in the virtual 3D environment at the time the electronic images were captured. Also, in one example, a virtual path of a camera control device may be captured by sampling a position of a camera control device in a physical environment (e.g., real world environment) at time intervals, and generating a smoothed 3D spline in 3D space (e.g., Cartesian coordinate space or polar coordinate space) using the sampled positions to generate the virtual path of the virtual camera. In one configuration, the captured electronic images may be saved to a storage device and/or streamed to client devices to allow spectators to view the electronic images. In one example, captured electronic images may be edited to modify some aspect of a scene or section of the electronic images. As an illustration, a scene in a video may be edited to zoom in or out of the scene, slow down or speed up the scene, or apply a camera filter to the scene.

Many 3D video games today incorporate cinematic storytelling to enhance gameplay. For example, some 3D video games include a cut-scene used to develop a storyline of the video game. The cut-scene view may flow like a scene in a cinematic film. A challenge associated with developing many high-quality 3D games that utilize cinematic storytelling is creating convincing and professional quality camera scenes. In the past, creating camera scenes for 3D video games involved manual processes in which an animator manually placed points in 3D space and configured splines to create a path for camera motion, which was subject to significant trial and error testing.

In one example, the present technology allows video game developers to create high quality camera scenes for use in video games by capturing scenes of a virtual 3D environment using a virtual camera controlled by a camera control device. The scenes may then be integrated into a 3D video game as cut-scenes. As a more detailed example, a video game developer can view a virtual 3D environment using a head mounted display and control a virtual camera using a camera control device attached to a motion stabilized body rig. A view of the virtual 3D environment from a perspective of the virtual camera can be displayed to the head mounted display, and the video game developer may navigate (e.g., walk, run, fly, teleport, etc.) the virtual 3D environment and capture video of the virtual 3D environment including any events and actions that occur within the virtual 3D environment. The video game developer may use the captured video to develop camera scenes for the video game. Capturing video in this way may significantly reduce an amount of time and effort typically associated with creating high quality camera scenes for a video game. Moreover, the present technology may be used to live stream (e.g., transmit electronic images at or near the time the electronic images are captured) and/or stream instant replays of electronic spectator sports competitions (eSports) to spectators. As an illustration, a camera person, using a head mounted display and a camera control device, may stand on the sidelines of an eSport event and record video of the eSport event using a virtual camera, and a video feed may be sent to client devices associated with spectators of the eSport event.

To further describe the present technology, examples are now provided with reference to the figures. FIG. 1 is a diagram that illustrates the concept of using a camera control device 102 to control a virtual camera 116 in a virtual 3D environment 114 and capture electronic images (e.g., video and/or images) of the virtual 3D environment 114 using the virtual camera 116. A virtual 3D environment 114 may include a virtual reality (VR) environment, an augmented reality (AR) environment, a mixed reality (MR) environment, simulation environment, 3D game environment, as well as other computer generated image environments. A VR environment may comprise a computer generated environment that includes images, sounds, and other sensations that simulates a user's physical presence in a virtual environment. An AR environment may comprise a direct or indirect view of a physical, real-world environment whose elements are augmented by computer-generated sensory input, such as sound, video, and graphics. An MR environment may comprise merging a real world and a virtual world to produce a new environment and visualizations where physical and digital objects co-exist and interact in real-time.

A virtual 3D environment 114 may include virtual objects. The virtual objects may include, but are not limited to: avatars (e.g., a human avatar, animal avatar, fantasy avatar, etc.) and other simulated objects (e.g., landscapes, vegetation, buildings, streets, mountains, enemies, vehicles, etc.). Capturing a virtual 3D environment 114 in electronic images (e.g., video and static images) may include capturing virtual objects within a view of a virtual camera 116, as well as actions and events that may be occurring within the virtual 3D environment 114 at the time the electronic images are captured. For example, actions and events may be captured during gameplay and may reflect a video game player's interactions with the virtual 3D environment 114 and other video game player actions.

As illustrated, a camera control device 102 may be attached to a camera rig 122 worn by a user 106. Illustratively, a camera rig 122 may include a shoulder support harness, camera boom, gimbal, camera cage, hand stabilizer, motion stabilizing mount 104, and the like. A motion stabilizing mount 104 or hand stabilizer may be configured to stabilize the camera control device 102 against disruptive motion, such as camera shake which can cause visible frame-to-frame jitter in a recorded video. As will be appreciated, any type of motion stabilizing mount 104 can be used, including hand held stabilizing mounts and camera shoulder brace stabilizing mounts. The user 106 may view the virtual 3D environment 114 using a display device, such as a head mounted display 108 or mobile screen, and navigate the virtual 3D environment 114 by moving around a physical environment 120 with the camera control device 102, and/or a user 106 may navigate the virtual 3D environment 114 using a controller device (shown in FIG. 3), such as a game controller. The camera control device 102 may be considered a camera proxy device, virtual camera master device, virtual camera console device, a camera simulation device, or another physical camera control device for controlling a virtual camera in a virtual 3D environment. For example, in some virtual 3D environments 114, a user 106 may use a game controller to fly, jump, drive a vehicle, or teleport while recording the virtual 3D environment 114 using a virtual camera 116.

Various tracking methods may be used to track a camera control device 102 in a physical environment 120, including optical and non-optical tracking methods described in more detail later in relation to FIG. 3. In one example, a camera control device 102 may include sensors that provide a position and orientation (e.g., a pose) of the camera control device 102 in a physical environment 120. In another example, a camera control device 102 may be tracked in a physical environment 120 using a tracking system (shown in FIG. 3), and a position and orientation of the camera control device 102 with respect to reference points, grid points or points of origin may be provided by the tracking system. A position and orientation of a camera control device 102 may be used to determine a virtual position and orientation of a virtual camera 116 in a virtual 3D environment 114. Also, the position and orientation of the camera control device 102 may be used to determine a path 110 of the camera control device 102 within the virtual 3D environment 114. The path 110 of the camera control device 102 may also indicate a direction of movement and speed of movement of the camera control device 102 within a physical space. The position, orientation, speed, and path 110 of the camera control device 102 may be translated to the virtual 3D environment 114 to generate a virtual camera 116.

A view 118 of a virtual camera 116 may be determined using a position and orientation of a camera control device 102, where the view 118 may be from a perspective of the virtual camera 116. A view 118 may be an observable area of a virtual 3D environment 114 as might be viewed through a simulated camera view finder. For example, a physical position of a camera control device 102 may be translated or correlated to a point in the virtual 3D environment 114 and an orientation of the camera control device 102 may be used to determine a view 118 from the point in the virtual 3D environment 114. Virtual camera control parameters may be applied to modify a view 118 of a virtual 3D environment as might be viewed through a simulated camera finder. Hardware controls mapped to virtual camera control parameters can be used to set the virtual camera control parameters which modify or change a view 118 a virtual 3D environment 114. As one example, a hardware zoom control may be used to set a zoom parameter that controls zoom functionality of a virtual camera lens which modifies the view 118 of a virtual 3D environment 114. As another example, a hardware pan control may be used to set a pan parameter that controls panning functionality of the virtual camera lens which modifies the view 118 of a virtual 3D environment 114. A view 118 of a virtual 3D environment 114 can be captured or recorded using a hardware capture or record control used to set a capture or record parameter. When set to capture or record, the capture or record parameter causes the portion of a virtual 3D environment included in the view 118 to be captured, simulating viewing an environment through a physical view finder of a camera and capturing an image or video of the environment viewable through the view finder.

Figure 2:
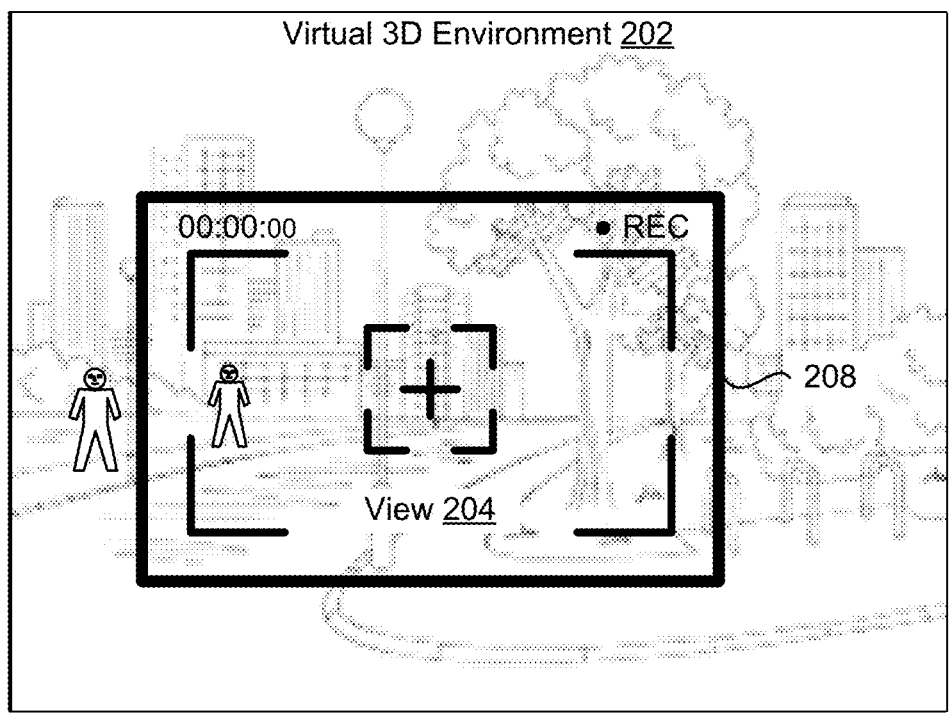
FIG. 2 is a diagram that illustrates a view of a virtual 3D environment that may be rendered and captured using a virtual camera.

An aspect ratio of a view 118 may be based on an industry standard for which electronic images are to be used. As an illustration, an aspect ratio used generate a view 118 can include the commonly used 4:3, 3:2, and 16:9 aspect ratios. After determining the view 118, data for the virtual 3D environment 114, including the geometry of objects in the virtual 3D environment 114 may be obtained, and a portion of the virtual 3D environment 114 contained in the view 118 may be rendered and output to a display device, such as a head mounted display 108. As a nonlimiting example shown in FIG. 2, a view 204 may be rendered using data for a virtual 3D environment 202 and displayed within a simulated camera view finder 208. A user may navigate the virtual 3D environment 202 and be provided with a view of the virtual 3D environment 202 through the simulated camera view finder 208 based on a physical position and orientation of a camera control device. This may allow the user to position a virtual camera, via a camera control device and the simulated camera view finder 208, and set up a view 204 that the user wants to capture using the virtual camera prior to recording, or otherwise capturing, the view 204.

Returning to FIG. 1, a camera control device 102 may include simulated hardware controls used to control virtual functions of a virtual camera 116. The hardware controls may be mapped to virtual camera controls that, for example, start and stop the capture of video, zoom a virtual camera lens in and out, apply filters (e.g., lens filters, digital filters, image stabilization filters, etc.), control panning, as well as provide other virtual camera controls. As an illustration, pressing a hardware control mapped to a virtual record/capture control may activate/deactivate a virtual record/capture control that causes the virtual camera to record video or capture an image of a virtual 3D environment 114. Pressing a hardware control mapped to a virtual zoom control may cause a virtual camera lens to zoom in or zoom out on a point in a virtual 3D environment 114. A user 106 may navigate the virtual 3D environment 114 and utilize the hardware controls included in the camera control device 102 to capture electronic images of the virtual 3D environment 114 and control other functions of the virtual camera 116.

In another example, a controller device 326 (shown in FIG. 3), such as a game controller, may include hardware controls which can be mapped to virtual camera controls for a virtual camera 116. The controller device may allow a user to control functions of the virtual camera 116 while using the controller device to navigate (e.g., walking, running, jumping, flying, teleporting, etc.) the virtual 3D environment 114. In yet another example, virtual camera controls for a virtual camera 116 may be displayed to a touch screen device (not shown) used to display the virtual 3D environment 114, allowing a user to control the virtual camera 116 via the touchscreen and record a virtual 3D environment 114 displayed on the touchscreen.

As explained earlier, a user 106 may navigate a virtual 3D environment 114 and use a virtual camera 116 to capture electronic images of the virtual 3D environment 114. As the user navigates the virtual 3D environment 114 using the camera control device 102, a virtual path 112 of the virtual camera 116 may be captured in the electronic images. A virtual path 112 may be simulated movement of a virtual camera 116 in a virtual 3D environment 114, providing the perception of walking, running, jumping, falling, flying, teleporting, driving, and other movements that may be performed in the virtual 3D environment 114. Movement of a camera control device 102 in a physical environment 120 may be tracked and the movement may be used to determine a path 110 of the camera control device 102 in the physical environment 120, and the path 110 may be simulated in the virtual 3D environment 114. In one example, a path 110 may be determined by analyzing positioning data to determine a change in position of a camera control device 102 in a physical environment 120 that indicates movement of the camera control device 102. The path 110 of the camera control device 102 may be used to create a virtual path 112 in a virtual 3D environment that simulates the path 110 of the camera control device 102 in the physical environment 120. In a case where a controller device may be used to navigate a virtual 3D environment 114, a virtual path 112 may be captured as the user 106 navigates the virtual 3D environment 114 using the controller device. As an illustration, a user may use a controller device to fly through the virtual 3D environment, during which, the user may record a scene of the virtual 3D environment 114 using the virtual camera 116.

In one example, a user may suspend recording of a virtual 3D environment 114 and save a virtual position and orientation of a virtual camera 116 within the virtual 3D environment 114 to allow the user 106 to reposition a camera control device 102 within a physical environment 120. For example, while moving in a direction within a physical environment 120, a user 106 may encounter a physical boundary, such as a wall or other obstacle, which prohibits the user 106 from moving further in the direction. In response to encountering the physical boundary, the user 106 may suspend recording by selecting, for example, a suspend hardware control included in the camera control device 102, which may result in saving a virtual position and orientation of the virtual camera 116 controlled by the camera control device 102. The user can then physically reposition to a location (e.g., a center point) in the physical environment 120 and resume recording of the virtual 3D environment 114 by selecting, for example, an unsuspend hardware control included in the camera control device 102. The ability to lock the virtual position of the virtual camera while physically re-positioning the camera control device 102 may enable the user to virtually move an unlimited distance while using a smaller physical space.

Figure 3:
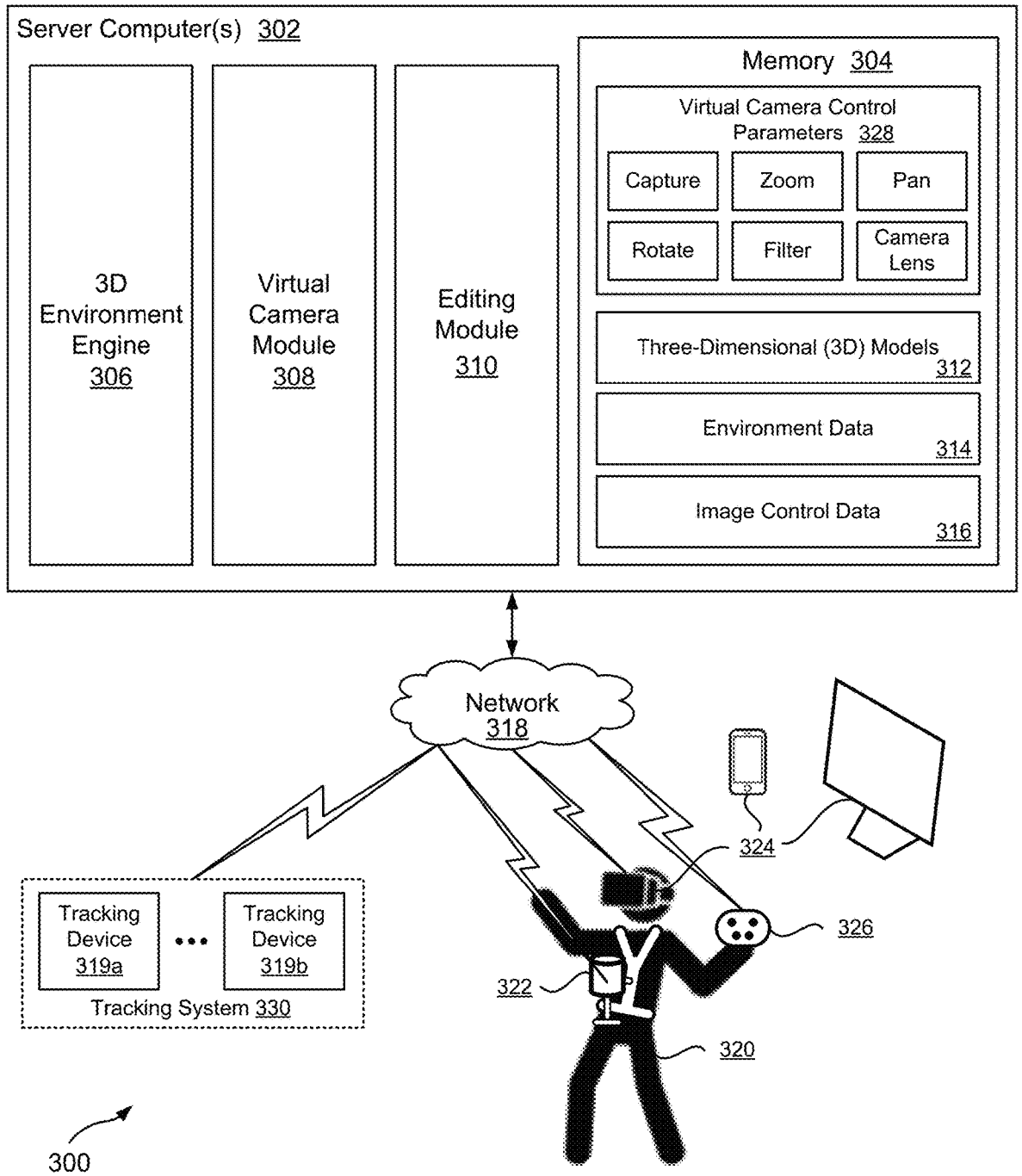
FIG. 3 is a block diagram that illustrates various example components included in a system for capturing electronic images of a virtual 3D environment using a virtual camera.

Moving now to FIG. 3, a block diagram illustrates components of an example system environment 300 on which the present technology may be executed. The system environment 300 may include a server computer 302 configured to host components used to execute a virtual 3D environment. While a single server computer 302 is shown, the system environment 300 may include any number of server computers. The server computer 302 may be in network communication with a plurality of devices 322/324/326 and 319a-b. The devices may include a camera control device 322 used to control a virtual camera, one or more display devices 324, controller device 326 (e.g., game controller), and a tracking system 330 that includes a plurality of physical tracking devices 319a-b (e.g., infrared and/or depth sensing cameras) which may be used to track a position and orientation of the camera control device 322. A display device 324 may be used to view a virtual 3D environment and may include a head mounted device (e.g., VR headsets, AR headset, mixed reality clients), display screen, mobile device, and other display devices on which a virtual 3D environment may be displayed.

The server computer 302 may contain a 3D environment engine 306, a virtual camera module 308, an editing module 310, and other modules. The 3D environment engine 306 may be configured to generate a virtual 3D environment using 3D models 312 and environment data 314, which may include gameplay data associated with locations, actions, and events associated with avatars and virtual objects that exist within a virtual 3D environment. The 3D environment engine 306 may be capable of generating a VR environment, AR environment, MR environment, 3D gaming environment, simulation environment or another computer generated image environment. The 3D environment engine 306 may be configured to generate images, sounds, and other events that generates a virtual 3D environment using 3D models 312, environment data 314, audio files, and other data. A virtual 3D environment generated using the 3D environment engine 306 may include virtual objects such as avatars (e.g., a human avatar, animal avatar, fantasy avatar, etc.) and other simulated objects (e.g., vegetation, buildings, vehicles, etc.).

The virtual camera module 308 may be configured to determine a view for a virtual camera and provide parameters for the view to the 3D environment engine 306 to allow the 3D environment engine 306 to render a virtual 3D environment as defined by the parameters for the view. In one example, the virtual camera module 308 may obtain positioning data for a camera control device 322, which may be connected to the server computer 302 via a network 318. The positioning data may include a physical position and orientation of the camera control device 322.

In one example, a non-optical method may be used to track a position of a camera control device 322. For example, a camera control device 322 may contain sensors, such as accelerometers, gyroscopes, and/or magnetometers, which can be used to measure lateral, rotational, and compass orientations of the camera control device 322. A gyroscope can be used to measure 360-degree rotation, accelerometers can be used to measure movement along coordinate axes (e.g., X, Y, and Z), and magnetometers can be used to determine orientation towards a magnetic field. In some examples, positioning data generated by the sensors may be used in combination with optical tracking, such as infrared tracking, passive reflector tracking, and active reflector tracking.

In another example, an optical method may be used to track a position and motion of a camera control device 322 and/or a user 320. For example, one or more tracking devices 319a-b included in a tracking system 330 may be used. A tracking device 319a-b may be a camera, such as an infrared and/or depth sensing camera, and images captured by the camera may be analyzed to detect a camera control device 322 and/or a user 320. Reference points or markers may also be provided on the camera control device 322 to enable capturing of the movement and position of the camera control device 322 (as discussed more below). Images captured by the tracking device 319a-b may be analyzed to determine a position of the camera control device 322 and/or the user 320. In at least one example, a position of a user 320 may be tracked by tracking a head mounted display worn by a user 320. In some examples, passive or active optical tracking may be used to track a position of a camera control device 322 and/or a user 320. Passive optical tracking uses a camera to detect light reflected off of passive markers, which may be attached to a user 320 and/or a camera control device 322. Active optical tracking uses active markers, such as computer controlled LEDs (light emitting diodes), which may be attached to a user 320 and/or a camera control device 322, and the LEDs may be different colors or may flash rapidly in sync with a position capture system. As will be appreciated, other methods of tracking may be used to track a position and motion of a camera control device 322 and/or a user 320, including laser-based tracking, wearable electromechanical sensor tracking, mechanical exoskeleton system tracking, and other tracking methods.

In addition to positioning data, the virtual camera module 308 may obtain virtual camera control parameters 328 stored in memory 304, such as zoom, pan, and rotate parameters. The virtual camera module 308 may be configured to translate the physical position and orientation of the camera control device 322 to a virtual position and orientation of a virtual camera in a virtual 3D environment and determine a view of a virtual camera in a virtual 3D environment based on the virtual position and orientation and the virtual camera control parameters 328. The virtual camera module 308 may send parameters for a view to the 3D environment engine 306, and the 3D environment engine 306 may render electronic images of the virtual 3D environment as defined by the parameters for the view.

A user may view a virtual 3D environment using a display 324 and capture electronic images of the virtual 3D environment using a virtual camera. In one example, a user 320 may navigate a virtual 3D environment by moving around in a physical space and positioning data may be generated for a camera control device 322 by tracking the camera control device 322 using a method described above. In another example, a controller device 326 may be used to navigate a virtual 3D environment.

A camera control device 322 may include a hardware interface that allows a user to control a virtual camera and capture electronic images of a virtual 3D environment. For example, the camera control device 322 may include a record control, pause control, fast forward control, rewind control, zoom controls, pan controls, and the like which a user can select to capture video or images of the virtual 3D environment and control various functionality of the virtual camera. The hardware interface may be linked to virtual camera control parameters 328, such that selecting a hardware control (e.g., a button) may cause a signal to be transmitted from the camera control device 322 to the server computer 302 and cause a virtual camera control parameter 328 associated with the signal to be set. For example, a record button may be linked to a capture parameter for a virtual camera and selecting the record button may set the capture parameter to a start or stop value. The virtual camera module 308 may be configured to monitor the capture parameter, and when the capture parameter is set to a start value, the virtual camera module 308 may capture data associated with the virtual camera and store image data to memory 304. In another example, a controller device 326 may be used to control a virtual camera, wherein the controls of the controller device 326 may be mapped to virtual camera control parameters 328 of the virtual camera.

As already mentioned, the virtual camera module 308 may monitor virtual camera control parameters 328 to allow a user 320 to control a virtual camera using the camera control device 322. The virtual camera module 308 may obtain a value of a virtual camera control parameter 328 and apply the value to the virtual camera, such that a view of a virtual 3D environment may be modified, a camera lens may be selected, a filter may be applied, or image control data 316 may be captured. In one example, image control data 316 may include or store positioning data, path data, and parameter data defining a one or more views of a virtual 3D environment. The image control data 316 may also include environment data 314 (e.g., gameplay data) that corresponds to a time when the image data 316 was captured. The image control data 316 (view parameters and 3D environment data) may be used to re-render electronic images of the virtual 3D environment. For example, the image control data 316 may be used to reconstruct the virtual 3D environment and gameplay captured in the virtual 3D environment at the time the image data 316 was captured. In another example, image data may be captured where the image data may include one or more video files or image files saved using an image format (e.g., AVI, MP4, JPEG, etc.) that allows the image data to be portable and played for viewing on a compatible device.

Figure 4:
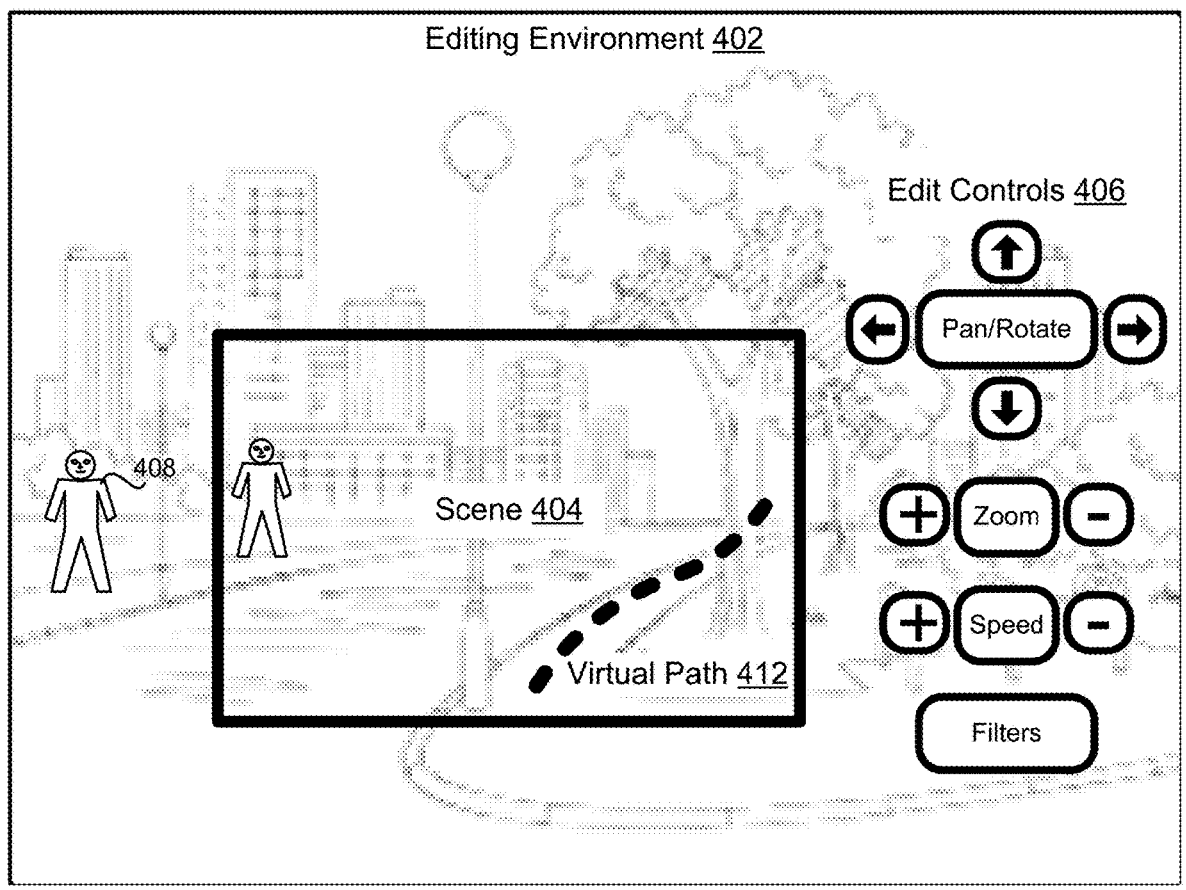
FIG. 4 is a diagram illustrating an example editing environment which may be used to edit captured images.

The editing module 310 may be used to edit image control data 316. For example, a user may edit electronic images captured within a virtual 3D environment by modifying image control data 316 to change a position, orientation, and/or path captured by a virtual camera. As a further illustration, image control data 316 can be edited to modify an aspect of a video, such as zooming in or out, slowing down or speeding up motion, panning towards or away from a virtual object, applying a filter, selecting an alternative camera lens, as well as other types of edits. The editing module 310 may provide an editing environment and editing tools for modifying image control data 316. For example, as shown in FIG. 4 an editing environment 402 may be used to edit image control data for a virtual camera position and orientation, and virtual camera controls used to generate a scene 404 in a virtual 3D environment. As shown, edit controls 406 may be provided to a user to allow the user to modify image control data for a scene 404 in a captured video. The image control data may be modified to capture a portion of a virtual 3D environment outside the bounds of a previous scene 404 to expand the scene 404 beyond what was originally captured in the scene 404. As an illustration, image control data may be modified so that a virtual 3D environment is reconstructed to include simulated environment data for a virtual object 408 (e.g., an avatar) which was not originally captured in a scene 404 of a video. The image control data may be modified to pan the scene 404 to include the virtual object 408 not originally included in the scene 404, such that after editing the image control data, the video may progress down a virtual path 412 and pan in a direction that captures the virtual object 408 in the scene 404.

Returning to FIG. 3, the various processes and/or other functionality contained within the system environment 300 may be executed on one or more processors that are in communication with one or more memory modules. In one example, the system environment 300 may include a number of computing devices that are arranged, for example, in one or more server banks or computer banks or other arrangements, which may be part of a service provider environment (e.g., a "cloud" environment). The computing devices may support a computing environment using hypervisors, virtual machine monitors (VMMs) and other virtualization software.

The system environment 300 may include data stores for storing data associated with the present technology. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical electronic images, or hard-drive type electronic images. The data store may be representative of a plurality of data stores as can be appreciated.

The network 318 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof. Components of the system environment 300, including a camera control device 322, display device 324, controller device 326 (e.g., a game controller), and/or tracking device 319a-b may be connected to the server computer 302 using a wireless protocol, such as WI-FI, BLUETOOTH, or the like.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module.

Figure 5:
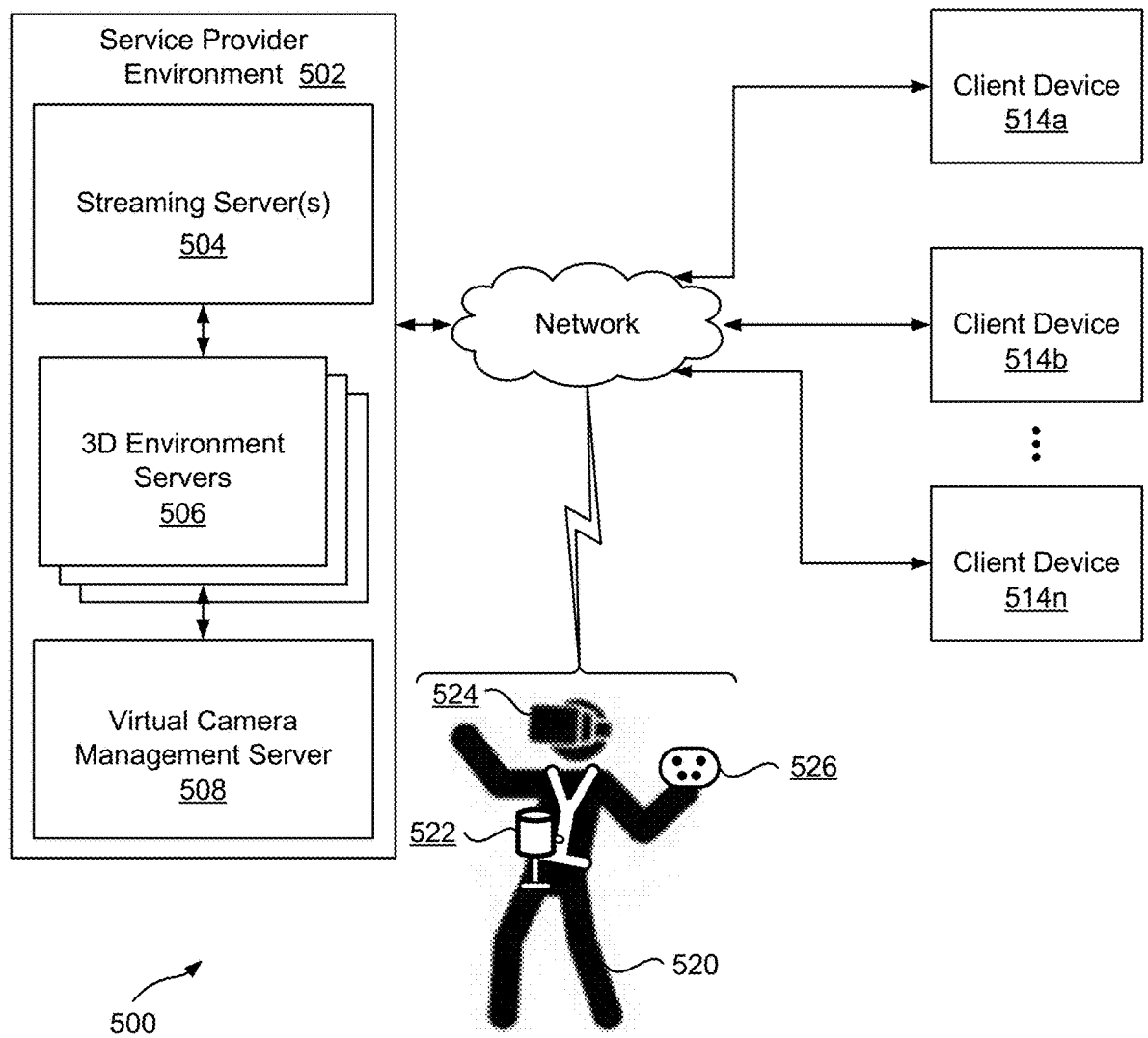
FIG. 5 is a block diagram that illustrates an example system for streaming electronic images captured using a virtual camera controlled by a camera control device to a plurality of client devices to allow spectators to view a stream of electronic images.

FIG. 5 is a block diagram which illustrates an example system 500 for capturing electronic images (e.g., video) of a virtual 3D environment and streaming the electronic images to a plurality of client devices 514a-n to allow spectators to view the electronic images. In one example, the system 500 may support broadcasts of live and/or recorded digital media content captured using a virtual camera which may be controlled via a camera control device 522 and/or a game controller 526. The media content may include live or recorded broadcasts of streams from video sports games, competitions, concerts, and other events including, but not limited to, live streams from electronic spectator sports (eSports) competitions (also referred to as competitive gaming), such as organized multiplayer video game competitions.

As illustrated, a service provider environment 502 may be used to host components of the system 500. For example, the service provider environment 502 may include 3D environment servers 506 that host game engines or virtual world engines, a streaming server 504 configured to stream media content, a virtual camera management server 508 configured to generate and manage a virtual camera controlled using the camera control device 522 and capture media content using the virtual camera, and other servers associated with capturing media content using the virtual camera and streaming the media content to client devices 514a-n. The 3D environment servers 506 may support virtual worlds, such as video game worlds, virtual meeting places, virtual marketplaces, and the like. In one example, the 3D environment servers 506 may support network-based games that may allow one, two, or more players, and in some cases even thousands of players, to simultaneously participate in a video game from client devices 514a-n coupled to a network. In one example, the service provider environment 502 may include computing resources for executing computing instances (e.g., virtual machines), which may be an instance of a software implementation of a machine (i.e. a computer) configured to emulate a physical machine, as described in more detail in association with FIG. 9. The computing instances may be used to host the 3D environment servers 506, the streaming server 504, and other components of the system 500.

A camera person 520 may remotely join a virtual event, such as a video game competition hosted on one or more 3D environment servers 506 or a virtual meeting, and the camera person 520 may record the video game competition or meeting, including avatars representing the participants by using a virtual camera controlled using a camera control device 522 and/or a video game controller 526. For example, the camera person 520 may view the video game competition via a head mounted display 524 and capture video of the video game competition using the virtual camera controlled using the camera control device 522. A virtual camera view finder may be displayed to the head mounted display 524. The camera person 520 may navigate the virtual 3D environment in which the video game competition is taking place by moving around a physical environment, wherein positioning data for the camera control device 522, head mounted display 524, and/or camera person 520 may be used to translate a physical position and orientation of the camera control device 522, head mounted display 524, and/or camera person 520 to a virtual position and orientation in the virtual 3D environment, allowing the camera person 520 to move around the virtual 3D environment, as described earlier. Alternatively, a game controller 526 may be used to navigate the virtual 3D environment.

Figure 6:
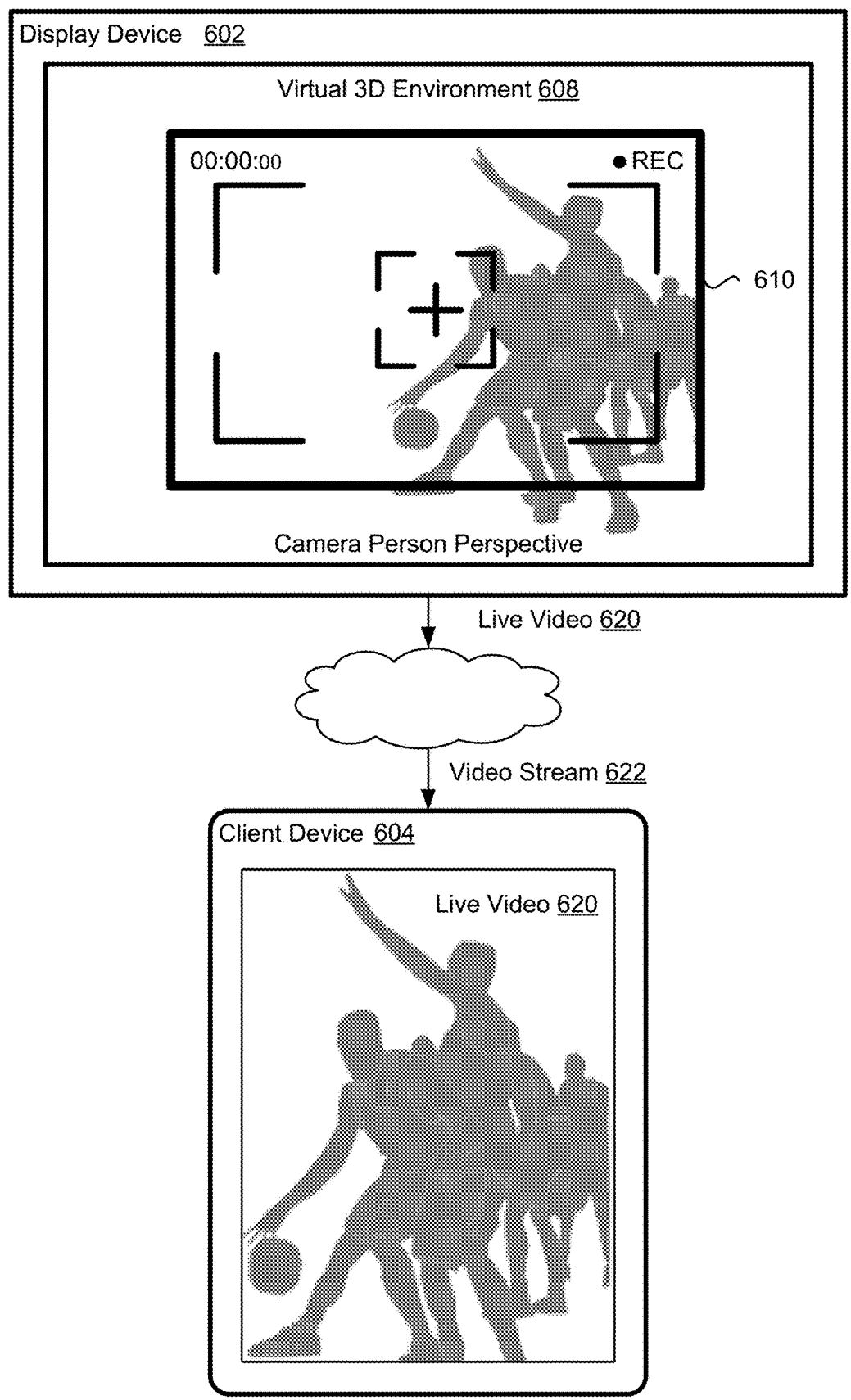
FIG. 6 is a diagram used to illustrate capturing live video of a virtual event taking place in a virtual 3D environment using a virtual camera controlled by a camera control device and streaming the live video to a client device.
Figure 7:
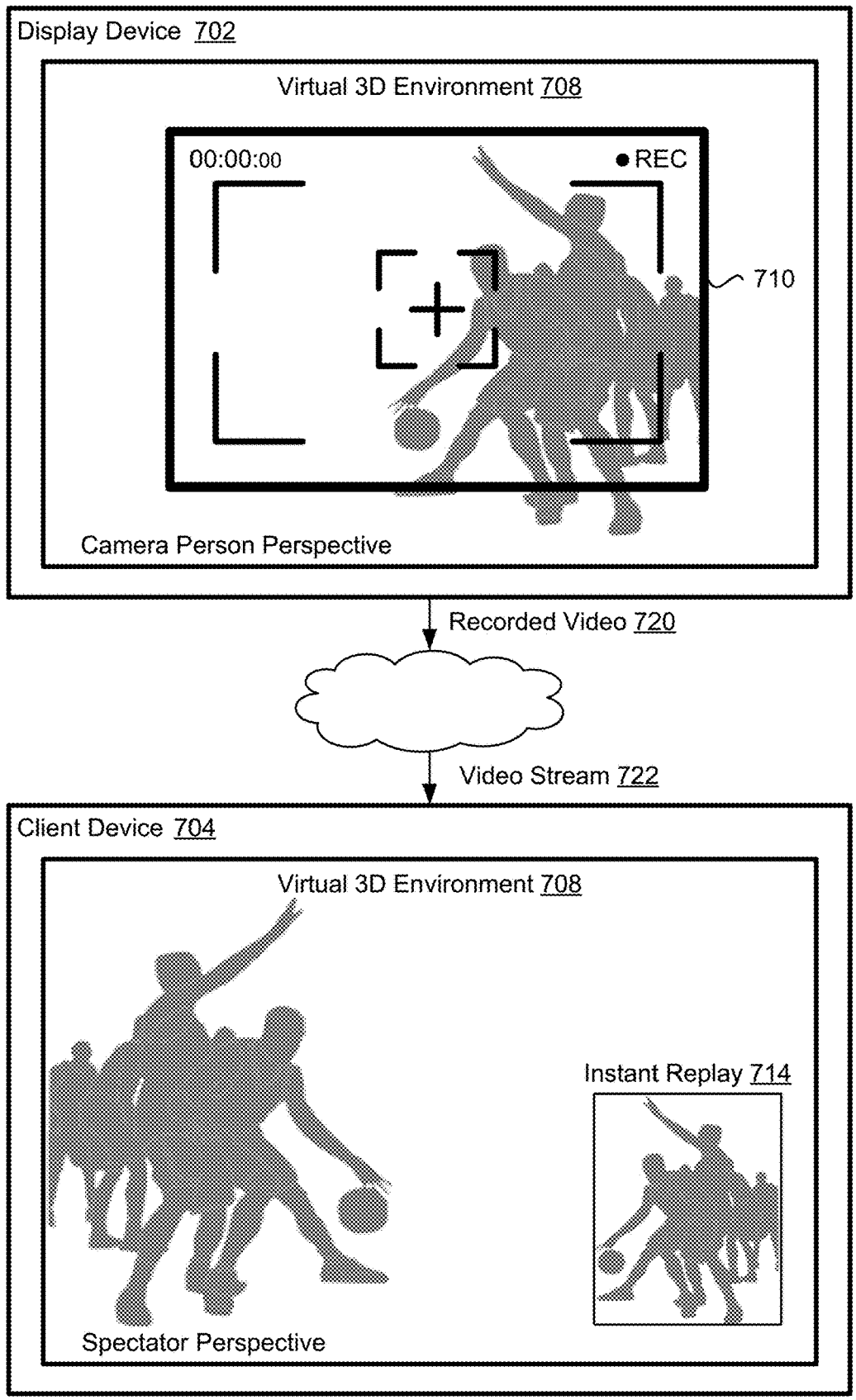
FIG. 7 is a diagram used to illustrate capturing video of a virtual event in a virtual 3D environment using a virtual camera controlled by a camera control device and providing the video to a client device as instant replay of the virtual event.

A video feed of a video game competition captured using a virtual camera may be sent to a streaming server 504 configured to stream the video to spectator's client devices 514a-n. As an illustration shown in FIG. 6, a camera person, using a display device 602 (e.g., a head mounted display) and a camera control device, may stand on the sidelines of an eSport event taking place in a virtual 3D environment 608 and record live video of the event using a virtual camera 610. A video feed of the live video 620 may be sent to a streaming server, and a video stream 622 of the eSport event may be sent to a plurality of client devices 604 to allow spectators to view the live video 620 of the eSport event. In some examples, commentators and/or broadcasters may input their own audio, text, graphics overlay, and/or video content into the video stream as well, and spectators may view the broadcast of the live video 620 on client devices 604. In another example illustrated in FIG. 7, recorded video 720 of an event (eSport event) taking place in a virtual 3D environment 708 may be recorded using a virtual camera 710, and the recorded video 720 may be provided to spectators as instant replay 714 of the event. For example, a camera person using a display device 702 and a camera control device may virtually stand on the sidelines of an eSport event and use a virtual camera 710 to record video 720 of a player scoring points against an opposing team. The recorded video 720 may be sent via a streaming server to a plurality of client devices 704 to allow spectators to view instant replay 714 of the player scoring the points. Although the virtual cameras illustrated in FIGS. 6 and 7 are shown as having a view finder, it will be appreciated that a view finder may not be included for use with a virtual camera.

Returning to FIG. 5, the client devices 514a-n may include any of a variety of devices including but not limited to desktop computer systems, laptop/notebook computer systems, pad/tablet devices, smartphone devices, game consoles, handheld gaming devices, and wearable devices. Thus, client devices 514a-n may range from desktop computers configured as gaming systems down to mobile devices such as smartphones, pad/tablet devices, and wearable devices. A client device 514a-n may implement an operating system (OS) platform that is compatible with the device. A client device 514a-n may include, but is not limited to, input and output components and client software. The client software on a particular client device may be tailored to support the configuration and capabilities of the particular device type and the OS platform of the device.

The service provider environment 502 may include a number of computing devices that are arranged, for example, in one or more server banks or computer banks or other arrangements. The computing devices may support a computing environment using hypervisors, virtual machine monitors (VMMs) and other virtualization software. API calls, procedure calls or other network commands that may be made in relation to modules and services included in the service provider environment 502 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. While the systems described above may be used to implement the present technology, many other similar or different system environments are possible. The example system environments discussed and illustrated above are merely representative and not limiting.

Figure 8:
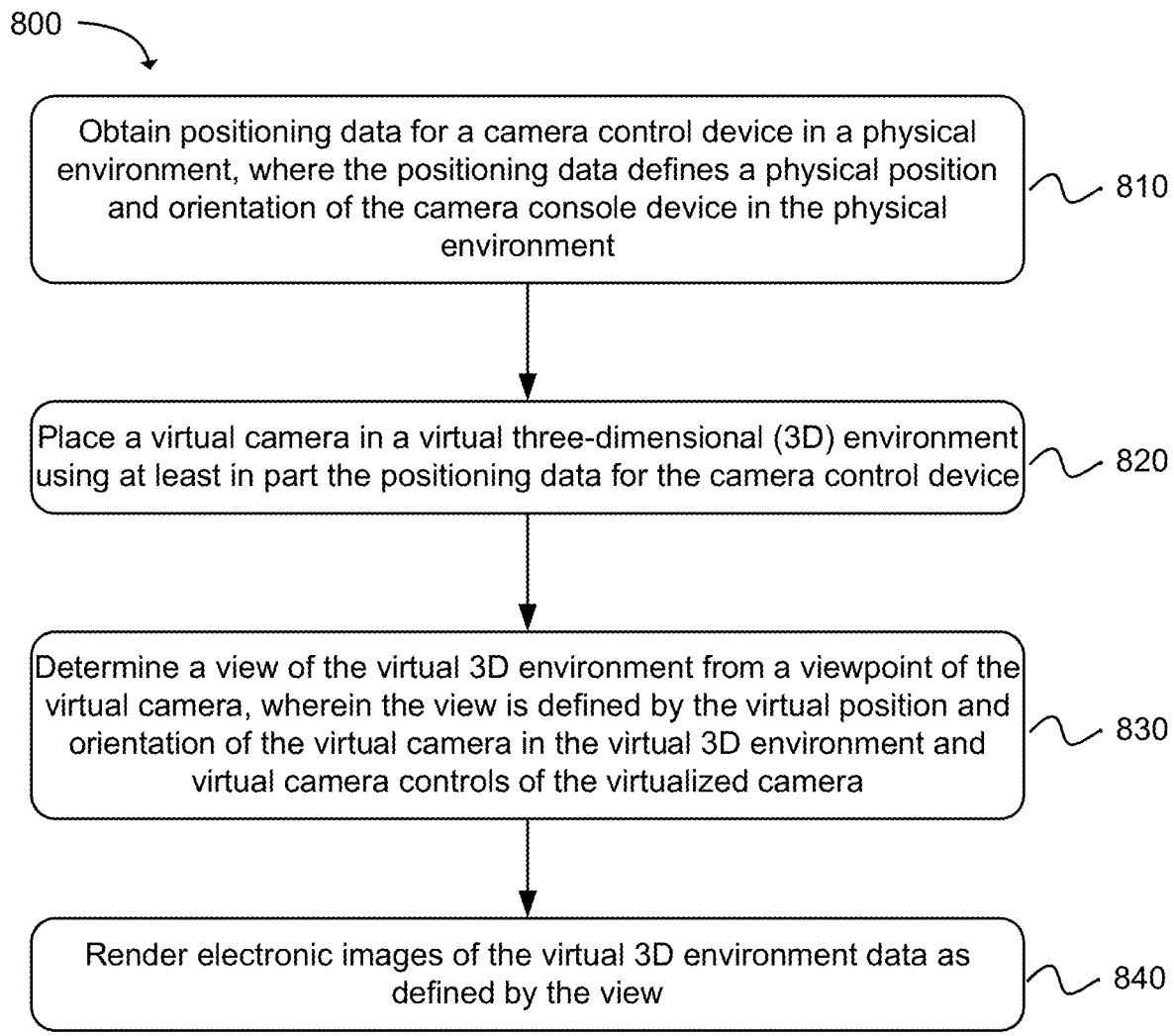
FIG. 8 is a flow diagram illustrating an example method for capturing electronic images of a virtual 3D environment using a virtual camera controlled by a camera control device.

Moving now to FIG. 8, a flow diagram illustrates an example method 800 for capturing electronic images of a virtual 3D environment using a virtual camera controlled using a camera control device that simulates a virtual camera and virtual controls in a virtual 3D environment. The virtual 3D environment may be one of a virtual reality (VR) environment, an augmented reality (AR) environment, a mixed reality (MR) environment, a graphical simulation environment, a gaming environment, a virtual meeting place, or a virtual marketplace.

As in block 810, positioning data may be obtained for a camera control device in a physical environment, wherein the positioning data defines a physical position and orientation of the camera control device in the physical environment. In one example, the positioning data may be obtained from the camera control device, which may be a hardware device configured with sensors that provide positioning data. In another example, the positioning data may be obtained from a tracking system used to track a physical position and orientation of the camera control device. The camera control device, in one example, may be attached to a motion stabilizing mount configured to stabilize the camera control device against disruptive motion. In another example, stabilization filter software may be applied to electronic images captured by a virtual camera to correct disruptive motion captured in the electronic images.

As in block 820, a virtual camera may be placed in a virtual 3D environment using at least in part the positioning data for the camera control device. For example, the positioning data for the camera control device may be translated or correlated to a virtual position and orientation in the virtual 3D environment and the virtual camera may be generated at that location in the virtual 3D environment and controlled using the positioning data. For example, a virtual position and orientation of the virtual camera may be updated based on positioning data generated by the camera control device. A virtual camera, in one example, may comprise a plurality of virtual cameras that have defined orientations in the simulated environment, and a virtual camera control may be used to select at least one of the plurality of virtual cameras to capture the electronic media of the virtual 3D environment. For example, due to virtualization, a virtual camera may not be constrained to the physical limitations of a physical camera. As such, a virtual camera can have any number of virtual lenses oriented in any direction, allowing for electronic images to be captured using any number of virtual lenses configured in any orientation. In addition, a virtual camera may include virtual lenses that can be offset from a primary virtual lens that correlates to a camera person's physical position or virtual position, such that a virtual lens offset from the primary lens that may provide a view perspective that is higher, lower, closer, or farther (e.g., 2 meters) from a view perspective provided by the primary lens.

The virtual camera may include virtual camera controls used to control various functions of the virtual camera, such as optical zoom, panning, rotating, lens selection, camera filters, and other virtual camera controls. Hardware controls included in a camera control device and/or a controller device (e.g., a game controller) may be mapped to the virtual camera controls. As a non-limiting example, a hardware button included in the camera control device may be mapped to a virtual capture/record control, and a hardware dial may be mapped to a virtual optical zoom control. A view of the virtual 3D environment may be updated based in part on commands that are invoked using the virtual camera controls. For example, a view may be decreased or increased in response to a command to zoom a virtual camera lens in or out.

As in block 830, a view of the virtual 3D environment from a viewpoint of the virtual camera may be determined. The view may be defined by a virtual position and orientation of the virtual camera in the virtual 3D environment and virtual camera controls of the virtual camera. For example, a view may be an observable area of a virtual 3D environment as viewed through a simulated camera view finder. A physical position of a camera control device may be translated to a point in the virtual 3D environment and an orientation of the camera control device may be used to determine the view from the point in the virtual 3D environment. Also, virtual camera controls for a virtual camera may be used to define in part a view of a virtual 3D environment. For example, a parameter for a virtual camera lens zoom may determine a portion of a virtual 3D environment to include in a view, such that the view may be decreased or increased based on the value of the parameter.

As in block 840, electronic images of the virtual 3D environment may be rendered as defined by the view. For example, data may for the virtual 3D environment may be obtained, where the data may be for the view of the virtual 3D environment from the viewpoint of the virtual camera, and the electronic images may be rendered using the data. The electronic images may be output to a display device, such as a head mounted display, to provide a user with a view of the virtual 3D environment from the viewpoint of the virtual camera, and to allow the user to navigate the virtual 3D environment and capture electronic images of the virtual 3D environment. Rendering electronic images may include capturing events and actions that may be occurring in the virtual 3D environment, such as gameplay of one or more players actively participating in a networked game.

In one example, a physical path of the camera control device may be identified and the physical path may be translated to a virtual path in the virtual 3D environment. For example, positioning data obtained from the camera control device may be analyzed to identify a path of the camera control device in the physical environment. A virtual path in the virtual 3D environment can then be calculated based in part on the path of the camera control device in the physical environment, and the electronic media may be rendered using the virtual path and data for the virtual 3D environment to simulate the path of the camera control device in the virtual 3D environment.

In another example, navigation commands may be received from a controller device (e.g., a game controller, or the like) used to navigate the virtual camera through the virtual 3D environment, and the electronic images may be rendered to simulate navigation of the virtual 3D environment according to the navigation commands. For example, a user may use a controller device (e.g., a console controller, an aviation joystick, etc.) to fly through the virtual 3D environment, during which, the user may film a scene of the virtual 3D environment using the virtual camera. A virtual path of the user flying through the virtual 3D environment may be recorded in the captured video.

The method 800 may further include determining that a record parameter for a virtual record control of the virtual camera is set to capture and store the electronic images to a storage device. The electronic images may be available for use in other applications, such as cut-scenes in a video game. Also, in one example, electronic images captured using a virtual camera may be streamed to spectators. For example, the method 800 may identify client devices that are subscribed to receive a stream of electronic images and send the stream to the client devices to allow spectators to view gameplay or other events in a virtual 3D environment.

Figure 9:
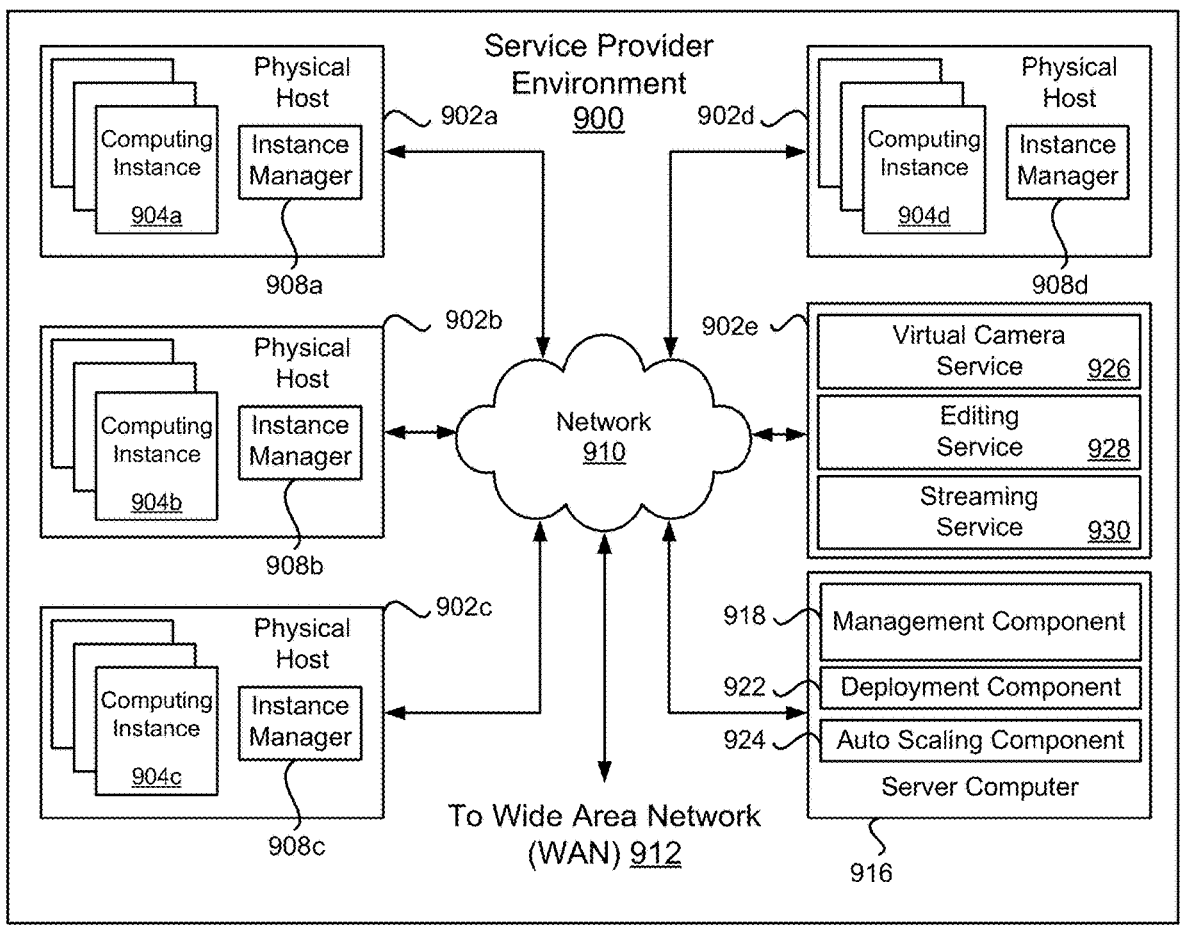
FIG. 9 is a block diagram that illustrates an example computing service environment on which the present technology may be hosted.

FIG. 9 is a block diagram illustrating a computing system diagram that illustrates one configuration for a service provider environment 900 which may be used to implement the technology described herein. The example service provider environment 900 shown in FIG. 9 may include several physical hosts 902a-e for providing computing resources for hosting applications and services. A physical host 902a-e may be a server computer configured to provide computer resources to host one or more computing instances 904a-d. A computing instance 904a-d may be a virtual machine. As known in the art, a virtual machine is an instance of a software implementation of a machine (i.e., a computer) that executes programs like a physical machine. In the example of computing instances 904a-d, each physical host 902a-e may be configured to execute an instance manager 908a-d capable of executing the computing instances 904a-d. Instance manager 908a-d may be a hypervisor or another type of program configured to enable the execution of multiple computing instances 904a-d on a single physical host 902a-e, for example. In one example, a physical host 902e may host a virtual camera service 926, an editing service 928, a streaming service 930, and other services for executing the functionality described earlier. In one example, the services 926/928/930 may be executed on computing instances hosted on the physical host 902e.

The service provider environment 900 may be capable of delivery of computing, storage, and networking capacity as a software service. In one example, the service provider environment 900 may be established for an organization by or on behalf of the organization. That is, the service provider environment 900 may offer a "private cloud environment." In another example, the service provider environment 900 may support a multi-tenant environment, wherein a plurality of customers may operate independently (i.e., a public cloud environment). Generally speaking, the service provider environment 900 may provide the following models: Infrastructure as a Service ("IaaS"), network-accessible system as a service, and/or Software as a Service ("SaaS"). Other models may be provided. For the IaaS model, the service provider environment 900 may offer computers as physical or virtual machines and other resources. The virtual machines may be run as guests by a hypervisor, as described further below. The network-accessible system as a service model delivers a computing system that may include an operating system, programming language execution environment, database, and web server.

It should be appreciated that although the embodiments disclosed herein are described primarily in the context of computing instances 904a-d, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing computing instances 904a-d.

The service provider environment 900 shown in FIG. 9 may also include a server computer 916 reserved for executing software components for managing the operation of service provider environment 900, physical hosts 902a-e, and computing instances 904a-d. In particular, server computer 916 may execute a management component 918. An entity may access management component 918 to configure various aspects of the operation of computing instance 904a-d purchased by the entity. For example, the entity may purchase computing instance 904a-d and make changes to the configuration of the computing instance 904a-d. The entity may also specify settings regarding how the purchased computing instances 904a-d are to be scaled in response to demand. The entity may also provide requests to launch computing instance 904a-d to management component 918.

An auto scaling component 924 may scale computing instance 904a-d based upon rules defined by an entity. For example, auto scaling component 924 may allow an entity to specify scale up rules for use in determining when new computing instance 904a-d should be instantiated and scale down rules for use in determining when existing computing instance 904a-d should be terminated.

The service provider environment 900 may also be configured with a deployment component 922 to assist entities in the deployment of new instances of computer resources. Deployment component 922 may receive a configuration from an entity that includes data describing how new computing instance 904a-d should be configured. For example, the configuration may specify one or more applications that should be installed in new computing instance 904a-d, provide scripts and/or other types of code to be executed for configuring new computing instance 904a-d, provide cache warming logic specifying how an application cache should be prepared, and other types of information.

Deployment component 922 may utilize the entity-provided configuration and cache warming logic to configure, prime, and launch new computing instance 904a-d. The configuration, cache warming logic, and other information may be specified by an entity using management component 918 or by providing this information directly to deployment component 922. Other mechanisms may also be utilized to configure the operation of deployment component 922.

In the example service provider environment 900, network 910, such as a local area network (LAN) may be utilized to interconnect physical hosts 908a-d and server computer 916. The network 910 may also be connected to WAN 912. It should be appreciated that the network topology illustrated in FIG. 9 has been simplified and that many more networks and networking devices may be utilized to interconnect the various components included in the service provider environment 900. Load balancing devices or software modules may also be utilized for balancing a load between each of the physical hosts 902a-e in the service provider environment 900 and between computing instances 904a-d. These network topologies and devices should be apparent to those skilled in the art.

It should be appreciated that service provider environment 900 is merely illustrative and that other implementations may be utilized. In particular, functionality described herein as being performed by management component 918, auto scaling component 924, and deployment component 922 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 10:
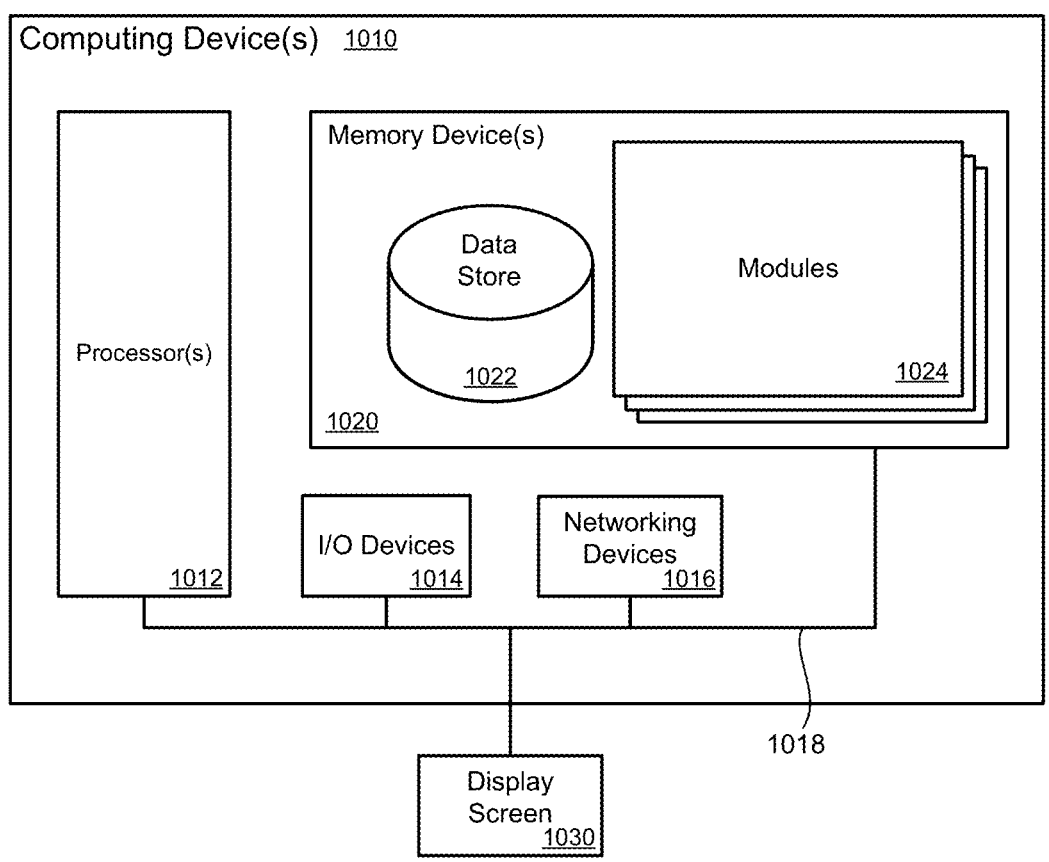
FIG. 10 is block diagram illustrating an example of a computing device that may be used to execute a method for capturing electronic images of a virtual 3D environment using a virtual camera controlled by a camera control device.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. In one example, the memory device 1020 may contain a virtual camera module 308, editing module 310, simulation environment engine modules, and other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device may also have access to I/O (input/output) devices 1014 that are usable by the computing devices. An example of an I/O device is a display screen 1030 that may be available to display output from the computing device 1010. Other known I/O devices may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local communication interface 1018 may be used as a network to facilitate communication between any of the multiple processors and multiple memories. The local communication interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable electronic images implemented with any technology for the storage of information such as computer readable instructions, data structures, program modules, or other data. Computer readable storage electronic images include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication electronic images. Communication electronic images typically embodies computer readable instructions, data structures, program modules and other data in a modulated data signal such as a carrier wave or other transport mechanism and includes any information delivery electronic images. A "modulated data signal" means a signal that has one or more of its characteristics set or changed in such a manner as to encode information in the signal. By way of example and not limitation, communication electronic images include wired electronic images such as a wired network or direct-wired connection and wireless electronic images such as acoustic, radio frequency, infrared and other wireless electronic images. The term computer readable electronic images as used herein includes communication electronic images.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for capturing electronic images using a virtual camera, comprising:
   at least one processor;
   a memory device including instructions that, when executed by the at least one processor, cause the system to:
   receive positioning data for a camera control device used to simulate the virtual camera and virtual camera controls in a virtual three-dimensional (3D) environment, wherein the positioning data specifies a physical position, physical orientation, and physical path of the camera control device in a physical environment;
   translate the positioning data of the camera control device to a virtual position, a virtual orientation, and a virtual path of the virtual camera in the virtual 3D environment, wherein the virtual path simulates the physical path specified in the positioning data;
   obtain parameters for the virtual camera controls from the camera control device, wherein the virtual camera controls are used to control functionality of the virtual camera;
   determine views of the virtual 3D environment from a viewpoint of the virtual camera based in part on the virtual position, the virtual orientation, and the virtual path of the virtual camera in the virtual 3D environment and the parameters for the virtual camera controls; and
   render the electronic images as defined by the views of the virtual 3D environment.

2. The system as in claim 1, wherein the memory device further includes instructions that, when executed by the at least one processor, cause the system to translate the virtual path in the virtual 3D environment using in part a motion stabilized version of the physical path specified in the positioning data.

3. The system as in claim 1, wherein the memory device further includes instructions that, when executed by the at least one processor, cause the system to output the electronic images to a head mounted display device to provide a view of the virtual 3D environment from the viewpoint of the virtual camera, and wherein the physical orientation is based at least in part on an orientation of the head mounted display device.

4. The system as in claim 1, wherein the memory device further includes instructions that, when executed by the at least one processor, cause the system to:
   determine that a capture parameter for a virtual record control of the virtual camera is set to capture; and
   store the electronic images to a storage device.

5. The system as in claim 1, wherein the memory device further includes instructions that, when executed by the at least one processor, cause the system to:
   identify client devices that are subscribed to receive a stream of the electronic images captured using the virtual camera; and
   send the stream of the electronic images to the client devices via a network.

6. A computer implemented method, comprising:
- obtaining positioning data for a camera control device in a physical environment, wherein the positioning data defines a physical position, a physical path and a physical orientation of the camera control device in the physical environment;
- placing a virtual camera in a virtual three-dimensional (3D) environment using at least the positioning data for the camera control device to determine a virtual position, a virtual path and a virtual orientation of the virtual camera in the virtual 3D environment, wherein the virtual path simulates the physical path defined in the positioning data;
- obtaining parameters for virtual camera controls from the camera control device, wherein the virtual camera controls are used to control functionality of the virtual camera;
- determining a view of the virtual 3D environment for the virtual camera, wherein the view is defined by the virtual position, the virtual path, the virtual orientation, and the parameters for the virtual camera controls; and
- rendering electronic images of the virtual 3D environment as defined by the view.

7. The method as in claim 6, wherein the virtual 3D environment is an eSports event and the view is different from views of players participating in the eSports event.

8. The method as in claim 6, further comprising:
- receiving navigation commands from a controller device used to navigate the virtual camera through the virtual 3D environment; and
- rendering the electronic images to simulate navigation of the virtual 3D environment according to the navigation commands.

9. The method as in claim 6, wherein the virtual camera comprises a plurality of virtual cameras that have defined orientations in the virtual 3D environment, and a virtual camera control, of the virtual camera controls, is used to select at least one of the plurality of virtual cameras to capture the electronic images of the virtual 3D environment.

10. The method as in claim 6, further comprising:
- receiving an edit command to modify the positioning data, forming updated positioning data; and
- re-rendering at least a portion of the electronic images using the updated positioning data.

11. The method as in claim 6, further comprising streaming the electronic images to client devices for instant replay in the virtual 3D environment to allow spectators of the virtual 3D environment to view the electronic images on the client devices.

12. The method as in claim 6, further comprising:
- receiving audio, text, graphics overlay, or video content generated by commenters or broadcasters of the virtual 3D environment; and
- streaming the audio, text, graphics overlay, or video content with the electronic images to client devices used to view the virtual 3D environment.

13. The method as in claim 6, wherein the camera control device is attached to a motion stabilizing mount configured to stabilize the camera control device against disruptive motion.

14. The method as in claim 6, further comprising applying stabilization filter software to the electronic images to stabilize motion captured in the electronic images.

15. The method as in claim 6, wherein the virtual 3D environment is at least one of: a virtual reality (VR) environment, an augmented reality (AR) environment, a mixed reality (MR) environment, a graphical simulation environment, a gaming environment, a virtual meeting place, or a virtual marketplace.

16. A non-transitory machine readable storage medium including instructions embodied thereon, wherein the instructions, when executed by at least one processor:
- obtain positioning data for a camera control device in a physical environment which defines a physical position, physical orientation, and physical path of the camera control device in the physical environment;
- control a virtual camera in a virtual three-dimensional (3D) environment using in part the positioning data for the camera control device to determine a virtual position, virtual orientation, and virtual path of the virtual camera in the virtual 3D environment, wherein the virtual path simulates the physical path defined in the positioning data;
- obtain parameters for virtual camera controls used to control virtual camera functions of the virtual camera;
- determine a plurality of views of the virtual 3D environment from a viewpoint of the virtual camera based on the parameters for the virtual camera controls, the virtual position, virtual orientation, and virtual path of the virtual camera in the virtual 3D environment; and
- render electronic images of the virtual 3D environment as defined by the plurality of views of the virtual 3D environment.

17. The non-transitory machine readable storage medium as in claim 16, further comprising instructions, that when executed by the at least one processor stream the electronic images to clients' devices which are subscribed to receive a stream of electronic images.

18. The non-transitory machine readable storage medium as in claim 16, wherein the positioning data for the camera control device is obtained from at least one tracking device used to track the camera control device within a physical space.

19. The non-transitory machine readable storage medium as in claim 16, wherein the positioning data and the parameters for the virtual camera controls are obtained from the camera control device which includes sensors that generate the positioning data and hardware controls that are mapped to the virtual camera controls.

* * * * *